(12) United States Patent
Diederiks et al.

(10) Patent No.: US 7,856,152 B2
(45) Date of Patent: Dec. 21, 2010

(54) LIGHT CONDITION RECORDER SYSTEM AND METHOD

(75) Inventors: Elmo M. A. Diederiks, Eindhoven (NL); Martijn A. B. Santbergen, Amsterdam (NL); Bartel Marinus Van De Sluis, Eindhoven (NL); Tatiana A. Lashina, Eindhoven (NL); Astrid Van Spronsen, Delft (NL); Andres Lucero Vera, Eindhoven (NL); Talitha Boom, Roermond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 344 days.

(21) Appl. No.: 11/909,477

(22) PCT Filed: Mar. 22, 2006

(86) PCT No.: PCT/IB2006/050889

§ 371 (c)(1),
(2), (4) Date: Sep. 25, 2007

(87) PCT Pub. No.: WO2006/100650

PCT Pub. Date: Sep. 28, 2006

(65) Prior Publication Data

US 2009/0284187 A1 Nov. 19, 2009

Related U.S. Application Data

(60) Provisional application No. 60/664,690, filed on Mar. 23, 2005.

(51) Int. Cl.
*G06K 9/40* (2006.01)

(52) U.S. Cl. .................. 382/274; 382/276; 703/4; 315/292

(58) Field of Classification Search .................. 315/292; 703/4, 13, 21, FOR. 802; 345/156, 173, 345/184; 382/274, 276
See application file for complete search history.

(56) References Cited

U.S. PATENT DOCUMENTS

| 1,951,213 | A | | 3/1934 | Schlumbohm |
| 3,706,914 | A | * | 12/1972 | Van Buren .................. 315/316 |
| 5,307,295 | A | * | 4/1994 | Taylor et al. .................. 703/1 |
| 5,399,940 | A | | 3/1995 | Hanna et al. |

(Continued)

FOREIGN PATENT DOCUMENTS

DE    3917101 A1    11/1990

(Continued)

OTHER PUBLICATIONS http://www.apogeekts.com/remote_control_via_cell_phone.htm—Use of mobile phone to turn on lighting—Downloaded on Jan. 7, 2005.

(Continued)

*Primary Examiner*—Thuy Vinh Tran

(57) ABSTRACT

A light condition recorder system and method including a light condition recorder (104) responsive to a lighting environment (102) and generating an environment signal (112), a light simulator (106) responsive to the environment signal (112) and generating a lamp control signal (114), and a lamp system (108) responsive to the lamp control signal (114) and generating a simulated lighting environment (110).

10 Claims, 5 Drawing Sheets

U.S. PATENT DOCUMENTS

| | | | |
|---|---|---|---|
| 5,961,201 | A | 10/1999 | Gismondi |
| 6,061,153 | A * | 5/2000 | Sugita ................... 358/518 |
| 6,195,589 | B1 | 2/2001 | Ketcham |
| 6,987,876 | B2 * | 1/2006 | Silber et al. ............. 382/152 |
| 7,202,613 | B2 * | 4/2007 | Morgan et al. ........... 315/312 |
| 7,348,736 | B2 * | 3/2008 | Piepgras et al. ......... 315/291 |
| 7,550,935 | B2 * | 6/2009 | Lys et al. ................. 315/318 |
| 2005/0018434 | A1 | 1/2005 | Giuliano |
| 2005/0030744 | A1 | 2/2005 | Ducharme et al. |
| 2005/0168465 | A1 * | 8/2005 | Tatsumi .................. 345/426 |
| 2008/0140231 | A1 * | 6/2008 | Blackwell et al. ......... 700/90 |

FOREIGN PATENT DOCUMENTS

| | | |
|---|---|---|
| FR | 2830314 | 4/2003 |
| GB | 749463 | 5/1956 |
| JP | 8024095 | 1/1996 |
| JP | 2002100485 | 4/2002 |
| KR | 1020030009926 A | 2/2003 |
| WO | 0247438 A2 | 6/2002 |
| WO | 02063206 A2 | 8/2002 |
| WO | 02082863 A1 | 10/2002 |
| WO | 02099333 A1 | 12/2002 |
| WO | 03037042 A1 | 5/2003 |
| WO | 03079318 A1 | 9/2003 |
| WO | 2004006570 A1 | 1/2004 |
| WO | 2004068837 A2 | 8/2004 |

OTHER PUBLICATIONS http://www.digitalhomemag.com/news/default.asp?pagetypeid=2&articleid=29392&subs—Use of a mobile phone as a TV remote—Downloaded on Jan. 7, 2005.

* cited by examiner

LIGHT CONDITION RECORDER SYSTEM AND METHOD

CROSS REFERENCE TO RELATED APPLICATION

This application claims the benefit of U.S. provisional application Ser. No. 60/664,690, filed Mar. 23, 2005, the entire subject matter of which is hereby incorporated by reference.

BACKGROUND OF THE INVENTION

The present invention relates generally to light system controllers, and more particularly, to a system and method for controlling a light system with a light condition recorder.

Light systems can be generally divided by function into task lighting and ambient lighting. Task lighting is designed to meet the needs of specific tasks, such as reading or applying makeup. Ambient lighting is designed to provide a general ambience or mood within an area. Problems arise when switching between task lighting and ambient lighting. Typically, a number of lamps must be switched individually to change from one to the other, such as when switching from lighting for reading alone to lighting for a social gathering. The user must remember appropriate lighting settings and make a number of adjustments. Even with sophisticated lighting systems employing remote controls, the user must locate a dedicated remote control, which is often missing or misplaced.

Accurate task lighting is critical for certain activities, such as dressing and applying makeup. Typically, dressing areas with mirrors have limited lighting control, if any. At best, the user is able to dim the lights. The problem is that lighting parameters, such as intensity, color temperature, and spectral distribution, influence the visual perception of people's skin tone, applied makeup, and color combinations in their clothes. Pastel makeup is unnoticeable under dimmed lighting, which is one of the reasons why 'evening makeup' is usually made in bright colors. The impossibility of simulating different lighting conditions in the dressing area or at the makeup mirror often leads to problems: a chosen color combination that looked fine at home is often jarring at the disco or the office. Another problem of the inability of simulating the lighting conditions of the place the user is going is that the user is unable to get into the mood of the destination. Without the appropriate lighting, combined with appropriate music and even fragrance, the user is unable to recreate the ambience of the occasion to prepare both physically and mentally.

It would be desirable to have a light condition recorder system and method that would overcome the above disadvantages.

SUMMARY OF THE INVENTION

One aspect of the present invention provides a light condition recorder system including a light condition recorder responsive to a lighting environment and generating an environment signal, a light simulator responsive to the environment signal and generating a lamp control signal, and a lamp system responsive to the lamp control signal and generating a simulated lighting environment.

Another aspect of the present invention provides a method of light system control, the method including recording a lighting environment, acquiring a light setting corresponding to the recorded lighting environment, and generating a simulated lighting environment in response to the light setting.

Another aspect of the present invention provides a light condition recorder system including means for recording a lighting environment, means for acquiring a light setting corresponding to the recorded lighting environment, and means for generating a simulated lighting environment in response to the light setting.

Another aspect of the present invention provides a light mixing user interface including a first light setting; a second light setting selected from a plurality of light settings; a slider path connecting the first light setting and the second light setting; and a slider moveable on the slider path. The position of the slider relative to the first light setting and the second light setting generates an adjusted light setting.

Another aspect of the present invention provides a light condition recorder system including a light condition recorder responsive to a lighting environment and generating an environment signal, a light controller responsive to the environment signal and generating a lamp control signal, and a lamp system responsive to the lamp control signal and generating a second lighting environment.

Another aspect of the present invention provides a method of light system control including providing a light condition recorder, storing a light setting corresponding to a lighting environment in the light condition recorder, and generating a second lighting environment in response to the stored light setting.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE INVENTION

Figure 1:
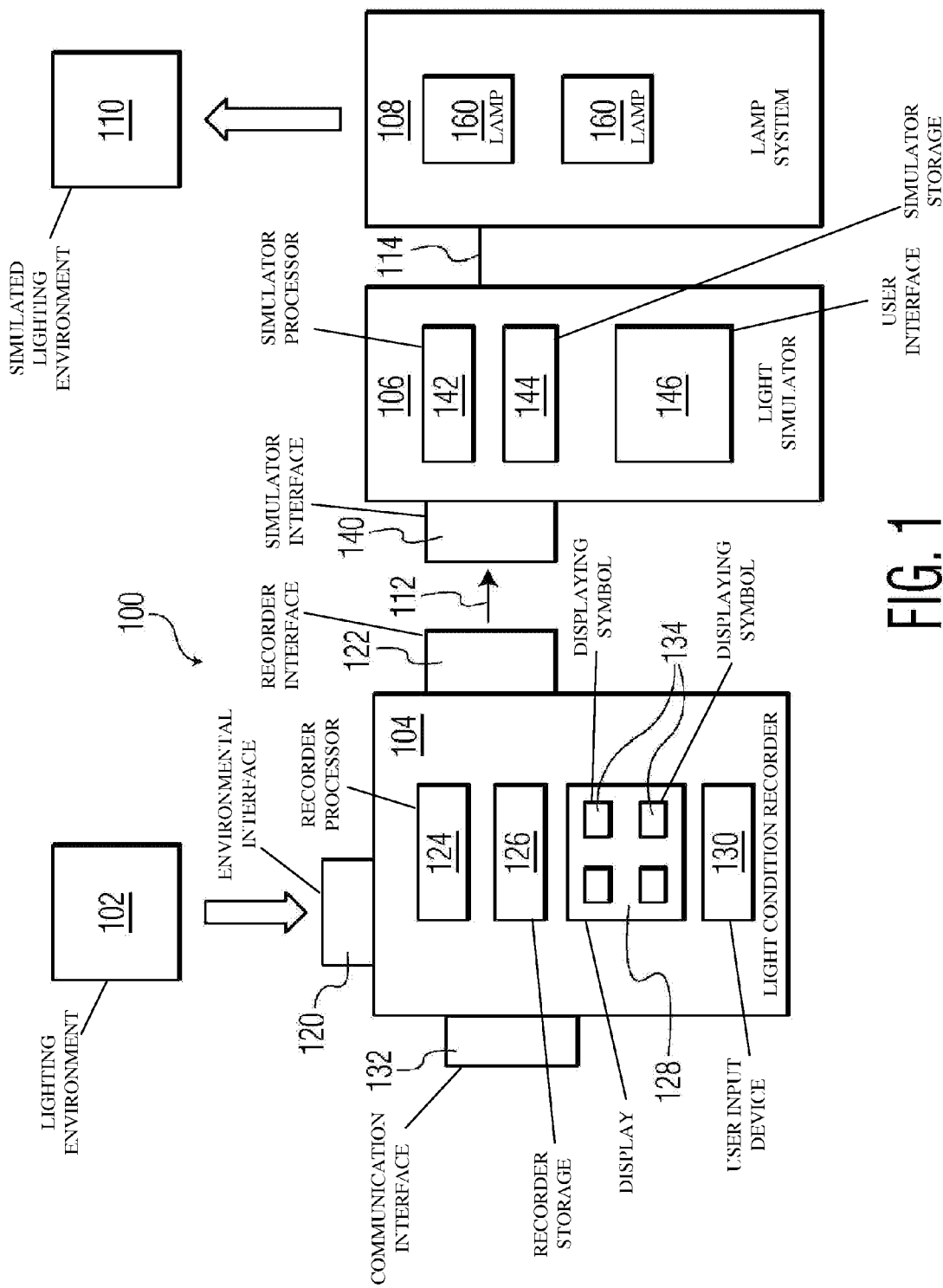
FIG. 1 is a block diagram of a light condition recorder system made in accordance with the present invention.

FIG. 1 is a block diagram of a light condition recorder system made in accordance with the present invention. A light condition recorder system 100 allows a user to record a lighting environment 102 and generate a simulated lighting environment 110. The light condition recorder system 100 includes the light condition recorder 104 responsive to the lighting environment 102 and generating an environment signal 112, a light simulator 106 responsive to the environment signal 112 and generating a lamp control signal 114, and lamp system 108 responsive to the lamp control signal 114 and generating the simulated lighting environment 110. In various embodiments, one or a number of light settings can be stored at the light condition recorder 104, the light simulator 106, and/or the lamp system 108: wherever it is convenient for the user to select a light setting for use on the lamp system 108 and/or to mix light settings to generate an adjusted light setting.

The lighting environment 102 can be any lighting environment which the user wants to use to generate a simulated lighting environment 110. The lighting environment 102 can be various locations under various lighting conditions. Examples of locations include outdoors, indoors, office, disco, home, living room, bedroom, dining room, or the like. Examples of lighting conditions include bright daylight, cloudy, artificial light, incandescent light, fluorescent light, artificial light in combination with natural light, conversational lighting, party lighting, reading lighting, task lighting, or the like. Indoors, one or a number of lamps, of a single type or of mixed types, can generate the lighting environment 102.

The simulated lighting environment 110 generated by the lamp system 108 can be any lighting reflecting the light setting used to generate the lamp control signal 114. Examples of simulated lighting of the simulated lighting environment 110 are shop lighting, home lighting, party lighting, reading lighting, task lighting, or any other desired lighting. One or more lamps 160 of the lamp system 108 adjusted for intensity, color, direction, and/or beam width in accordance with the light setting generate the simulated lighting environment 110. The lamp system 108 can also include lenses, reflectors, filters, drive motors, and the like as desired to produce particular lighting effects.

The light condition recorder 104 records the lighting environment 102 through an environmental interface 120 and provides an environment signal 112 to the light simulator 106 through a recorder interface 122. The recorder interface 122 can be wired and dockable, such as a docking station, cradle, or the like, or can be wireless, such as a Bluetooth, Zigbee, Digital Addressable Lighting Interface (DALI), wireless LAN interface, or the like. The light condition recorder 104 includes a recorder processor 124 and recorder storage 126 for respectively processing and storing input from the environmental interface 120. The recorder storage 126 can be any suitable storage for storing data and/or instructions, such as solid state memory, optical drives, magnetic drives, or the like. In various embodiments, the light condition recorder 104 can include a display 128 for displaying symbols 134, a user input device 130, a communication interface 132, or the like, as required for a particular application. In one embodiment, the display 128 and user input device 130 can be used as a user interface for selection and/or mixing of light settings. The light condition recorder 104 can be a dedicated device or can be implemented on an existing portable device, such as a mobile telephone, a personal digital assistant (PDA), a digital camera, a light meter, a notebook computer, or the like. The light condition recorder 104 can also include commands within the environment signal 112 to control the simulated lighting environment 110 in real time.

In one embodiment, the environmental interface 120 is an optical sensor, such as optics with an image sensor, like a charge-coupled device (CCD), Complementary Metal Oxide Semiconductor (CMOS) device, or the like. The light condition recorder 104 records the lighting environment 102 by taking a photograph with the optical sensor. The light condition recorder 104 can include a display 128, such as a liquid crystal display (LCD), an organic light emitting diode (OLED) display, or the like, and a user input device 130, such as a touchpad, keyboard, or the like. The display 128 can be used to display new or stored photographs. The light condition recorder 104 can also include a communication interface 132 for connecting the light condition recorder 104 to a cellular telephone network. One example of a suitable device is a mobile phone including a camera, although those skilled in the art will appreciate that a number of devices are possible.

In operation, the user uses the user input device 130 of the light condition recorder 104 to take a photograph of the lighting environment 102 through the environmental interface 120, which in this case is an optical sensor. The photograph is displayed on the display 128 and stored in the recorder storage 126. In one embodiment, the photograph is downloaded from the light condition recorder 104 through the recorder interface 122 within the environment signal 112 to the light simulator 106 for analysis and generation of a light setting. In an alternative embodiment, the photograph is analyzed in the recorder processor 124 for light intensity and/or light color information, and the light setting downloaded from the light condition recorder 104 through the recorder interface 122 within the environment signal 112 to the light simulator 106. The light simulator 106 uses the light setting to generate the simulated lighting environment 110 from the lamp system 108. In an alternative embodiment, the photograph of the lighting environment 102 is received through the communication interface 132 rather than the environmental interface 120.

Another operation uses the light condition recorder 104, such as a mobile telephone, to take the photograph, analyze the photograph to acquire light settings, and store the photograph and light setting in the recorder storage 126 of the light condition recorder 104. The light condition recorder 104 can associate the photograph with the light setting when the user takes the photograph. In one embodiment, the light condition recorder 104 can be used to control the simulated lighting environment 110 from the lamp system 108 by selecting a light setting stored in the recorder storage 126. The user can display stored photographs on the display 128, select one of the stored photographs using the user input device 130, and control the simulated lighting environment 110 using the stored light setting associated with the selected photograph.

In another embodiment, the environmental interface 120 is a signal interface, such as an antenna for receiving a wireless signal, such as a Bluetooth, Zigbee, Digital Addressable Lighting Interface (DALI), wireless LAN signal, or the like. The light condition recorder 104 records the lighting environment 102 by uploading light settings from the lamp system generating the lighting environment 102 or from any light setting storage device storing light settings through the antenna. This permits copying of light settings from one light system to another. In one embodiment, the environmental interface 120 can be omitted and the recorder interface 122 used as both the environmental and recorder interfaces. The light condition recorder 104 can include a display 128, such as a liquid crystal display (LCD), an organic light emitting diode (OLED) display, or the like, and a user input device 130, such as a touchpad, keyboard, or the like. In one embodiment, the display 128 is combined with the user input device 130 in a touch screen display. The display 128 can be used to display symbols 134, such as photographs, graphical images, drawings, icons, titles, combinations thereof, and the like. The symbols 134 can be used to represent corresponding light settings and can be any visual representation desired. One light setting can be represented by more than one symbol, such as a photograph, a graphical image, and an icon. One example of a suitable device is a personal digital assistant with a wireless capability, although those skilled in the art will appreciate that a number of devices are possible.

In operation, the user uses the user input device 130 of the light condition recorder 104 to upload the light settings of the lighting environment 102 through the environmental interface 120, which in this case is a signal interface. The light settings are used by a lamp system (not shown) at the lighting environment 102 to generate the lighting environment 102. The light settings can be uploaded directly from the lamp system generating the lighting environment 102 or from a light setting storage device, such as a mobile telephone, a personal digital assistant (PDA), a digital camera, a light meter, a notebook computer, or the like, which can store light settings. The user can enter or select a symbol 134, such as a photograph, graphical image, drawing, icon, or title, on the display 128 to identify the lighting environment 102; associate the light setting with the symbol; and store the light setting in the recorder storage 126 of the light condition recorder 104. In an alternative embodiment, the symbol 134 can also be uploaded to the light condition recorder 104. The light setting can be downloaded from the light condition recorder 104 through the recorder interface 122 within the environment signal 112 to the light simulator 106. The light simulator 106 uses the light setting to generate the simulated lighting environment 110 from the lamp system 108.

In another embodiment, the environmental interface 120 is an optical power detector and/or a color sensor. The light condition recorder 104 records the lighting environment 102 by reading environmental light intensity and/or light color information through the optical power detector and/or a color sensor, respectively. One example of a suitable device is a dedicated light condition recorder, like a photographic light meter or colorimeter, although those skilled in the art will appreciate that a number of devices are possible.

In operation, the user reads the environmental light parameter, such as light intensity and/or light color information, with the light condition recorder 104 and stores the light parameter in the recorder storage 126 of the light condition recorder 104 as the light setting. The light parameter is downloaded from the light condition recorder 104 through the recorder interface 122 within the environment signal 112 to the light simulator 106. The light simulator 106 uses the light parameter to generate the simulated lighting environment 110 from the lamp system 108.

The light simulator 106 receives the environment signal 112 from the light condition recorder 104 through a simulator interface 140 and provides the lamp control signal 114 to the lamp system 108. The lamp control signal 114 controls display of the simulated lighting environment 110 by the lamp system 108. The simulator interface 140 is compatible with and complementary to the recorder interface 122. The light simulator 106 includes a simulator processor 142 and simulator storage 144 for respectively processing and storing light settings from the light condition recorder 104 and output for the lamp system 108. The simulator storage 144 can be any suitable storage for storing data and/or instructions, such as solid state memory, optical drives, magnetic drives, or the like. The user can use a user interface 146 to provide input and receive output from the light simulator 106. In one embodiment, the user interface 146 can be used to adjust the light setting for user preferences. In one embodiment, the user interface 146 is detachable from the light simulator 106 and can be operated remotely. In an alternative embodiment, the user interface 146 is a stand-alone device connected to the light simulator 106, such as a general purpose computer. In one embodiment, the light simulator 106 is part of the lamp system 108, such as part of a display mirror.

In one embodiment, the light simulator 106 analyzes a photograph received from the light condition recorder 104 for light settings used to generate the simulated lighting environment 110 from the lamp system 108. The color space of the photograph, such as sRGB, is converted to lighting color space, such as x, y, Y, and even into the color space of the specific lamps 160 of the lamp system 108, as desired for a particular application. The analysis can also apply optimization algorithms, such as gamma correction, brightness correction, or the like, as desired. One example of analysis is described in WIPO Patent Publication No. WO2004006570 to Diederiks, et al., entitled Method Of And System For Controlling An Ambient Light And Lighting Unit, incorporated by reference herein. In another embodiment, the analysis is performed in a stand-alone device connected to the light simulator 106, such as a general purpose computer, which can also serve as the user interface 146. The light setting is stored in the simulator storage 144 of the light simulator 106.

FIGS. 2A-2D are schematic diagrams of light mixing user interfaces for a light condition recorder system made in accordance with the present invention. The light condition recorder and/or light simulator can store a number of light settings as lighting presets for selection and/or mixing by the user. Each light setting includes information for a particular simulated lighting environment, such as light intensity, light color information, beam angle, beam width, and the like. The light setting can include the information for one or a number of lamps. The multiple light settings can be combined and mixed to generate adjusted light settings. FIGS. 2A-2D illustrate exemplary light mixing user interfaces of a linear slider, a radius circular slider, an extended circular slider, and a bounded circular slider, respectively. In one embodiment, the light mixing user interfaces are implemented as a touch sensitive user interface on a display mirror connected to the lamp system. In one embodiment, the light mixing user interfaces are implemented on the display and user input device of a light condition recorder. In one embodiment, the light mixing user interfaces are implemented on the user interface of the light simulator. In one embodiment, the light mixing user interfaces are implemented as mechanical devices. In an alternative embodiment, the light mixing user interfaces are implemented in software and shown on a display, with the user providing input though a mouse, joystick, touchscreen, or the like.

Figure 2A:
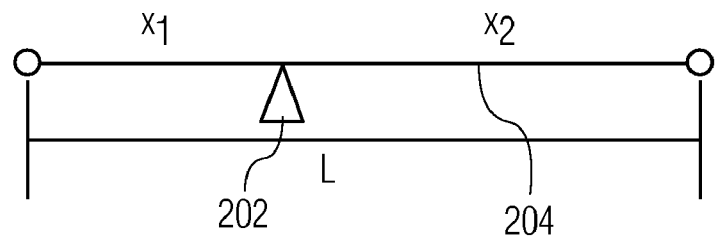
FIGS. 2A-2D are schematic diagrams of light mixing user interfaces for a light condition recorder system made in accordance with the present invention.

FIG. 2A illustrates a linear slider for providing an adjusted light setting between two light settings, which are labeled as preset A and preset B. The slider 202 follows a linear path 204 as a slider path between preset A and preset B. The closer the slider 202 is to either preset, the more the characteristics of the closer light setting is reflected in the adjusted light setting. In one embodiment, the adjusted light setting is a linear interpolation between the two light settings based on the slider position.

In one example, a first light setting for a lamp system includes an intensity of 60 for a first lamp and 40 for a second lamp. A second light setting for the lamp system includes an intensity of 100 for the first lamp and 20 for the second lamp. When the slider is equidistant between the first and second light settings, the adjusted light setting for the lamp system is averaged to an intensity of 80 for the first lamp and 30 for the second lamp. When the slider is one-quarter range from the first light setting and three-quarters range from the second light setting, the adjusted light setting is 70 for the first lamp and 35 for the second lamp.

Those skilled in the art will appreciate that color values expressed as a set of numbers indicating a particular color light setting, e.g., (60, 20, 240), can be treated in the same manner so that an adjusted light setting is generated from different color light settings. For example, a middle slider setting between first color light setting of (60, 20, 240) and a second color light setting of (30, 10, 120) results in an adjusted light setting of (45, 15, 180).

Figure 2B:
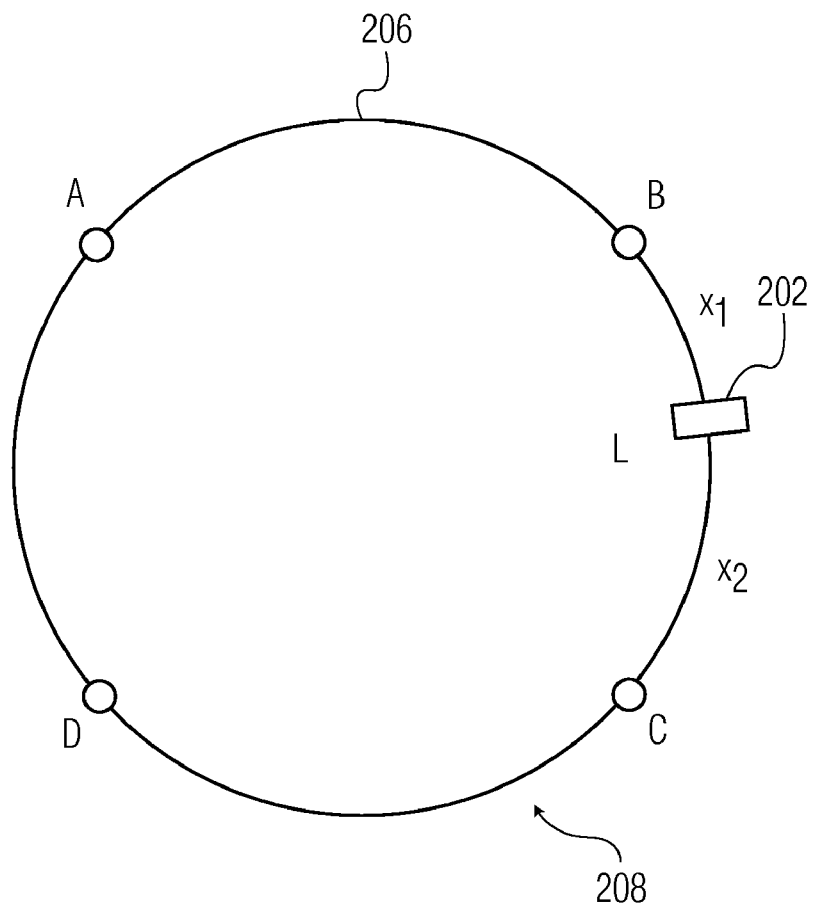

FIG. 2B illustrates a radius circular slider for providing an adjusted light setting between a number of light settings, which are labeled as A, B, C, and D on the circumference of circle 208. The slider 202 follows a radius path 206 as a slider path on the circumference of circle 208. The adjusted light setting is a function of the two adjacent light settings which the slider 202 is between. The closer the slider 202 is to a preset, the more the characteristics of the closer light setting is reflected in the adjusted light setting. In one embodiment, the adjusted light setting is a linear interpolation between the two adjacent light settings based on the slider position.

Figure 2C:
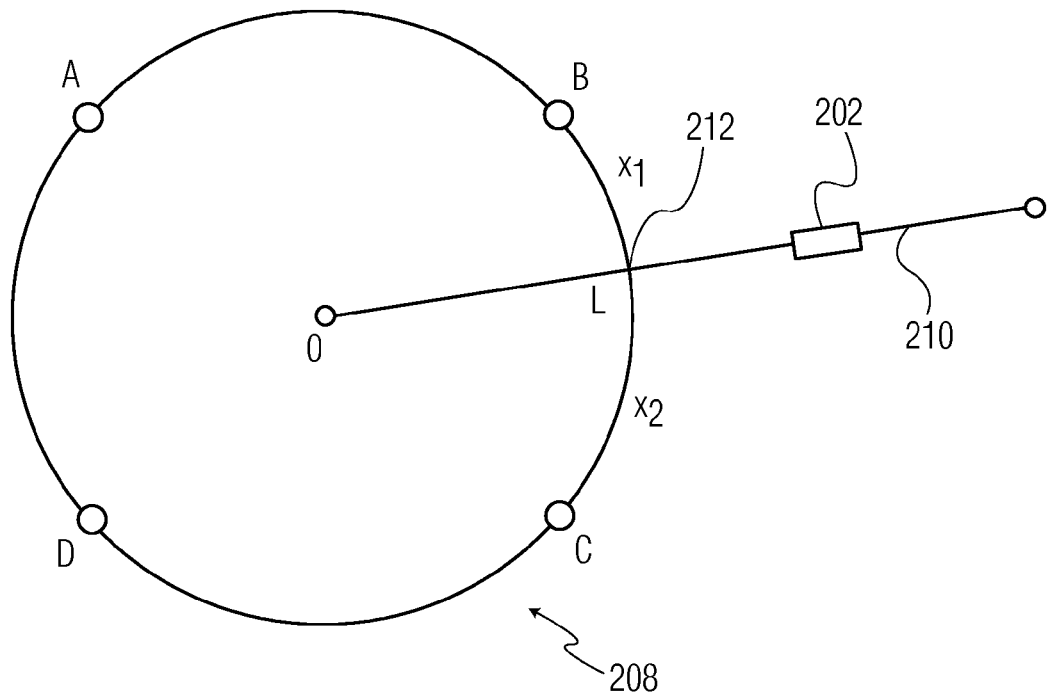

FIG. 2C illustrates an extended circular slider for providing an adjusted light setting between a number of light settings, which are labeled as A, B, C, and D on the circumference of circle 208. The slider 202 follows rotatable path 210 between the ends labeled 0 at the center of the circle 208 and Max outside the circle 208. The rotatable path 210 is rotated by the user about the center of the circle 208 labeled as 0. The position of the slider 202 on the rotatable path 210 as one slider path relative to the ends labeled 0 and Max adjusts one portion of the adjusted light setting. The intersection 212 of the rotatable path 210 with the circumference of circle 208 as another slider path relative to the adjacent light settings adjusts another portion of the adjusted light setting. That is, one path generates the adjusted light setting and another path modifies the adjusted light setting. For example, the position of the slider 202 on the rotatable path 210 can adjust the intensity of the adjusted light setting and the intersection of the rotatable path 210 with the circumference of circle 208 can adjust the light color information of the adjusted light setting. In one embodiment, the portion of the adjusted light setting affected by the intersection of the rotatable path 210 with the circumference of circle 208 is a linear interpolation between the two adjacent light settings based on the intersection position.

Figure 2D:
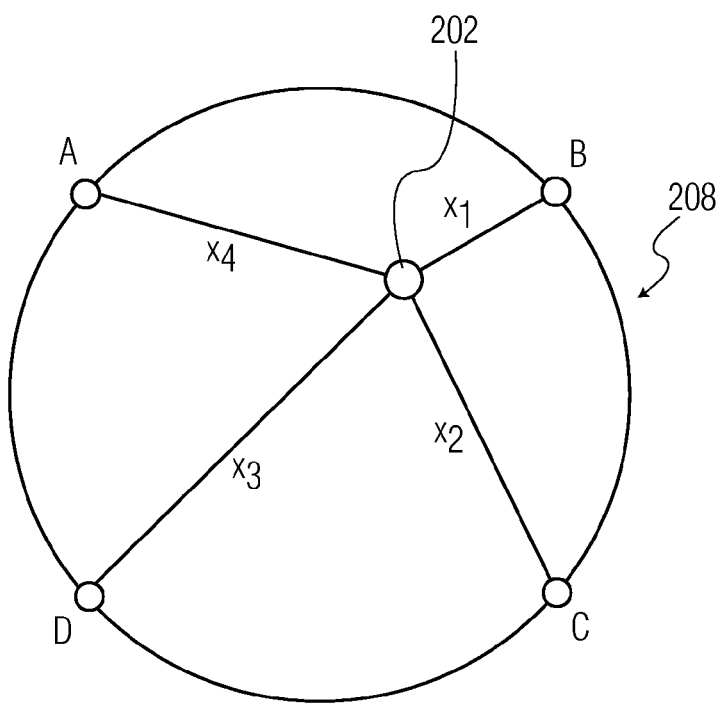

FIG. 2D illustrates a bounded circular slider for providing an adjusted light setting between a number of light settings, which are labeled as A, B, C, and D on the circumference of circle 208. The slider 202 is free to move within the interior of circle 208, the interior of the circle being the slider path. The adjusted light setting is a function of the distance of the slider 202 from each light setting. The exemplary distances are labeled as x1, x2, x3, and x4. The closer the slider 202 is to a light setting, the more the characteristics of the closer light setting are reflected in the adjusted light setting. In one embodiment, the proportional contribution of each light setting to the adjusted light setting is the distance between the slider 202 and the light setting divided by the sum of the distances between the slider 202 and each light setting.

Those skilled in the art will appreciate that the number of light settings appearing on the light mixing user interface can be selected by the user as desired. The particular light settings appearing on the light mixing user interface can also be selected by the user from the light settings stored in the light simulator. The light settings can also be arranged with different distances between adjacent light settings to change the weight accorded the various light settings.

Referring to FIG. 1, the lamp system 108 includes one or a number of lamps 160 responsive to the lamp control signal 114 and generating the simulated lighting environment 110. The lamp system 108 can vary the intensity, color, color temperature, direction, and/or beam width of the light provided as the simulated lighting environment 110. The lamps 160 in the lamp system 108 can be of a single type or a mixture of types, such as incandescent lamps, fluorescent lamps, light emitting diode (LED) lamps, or the like, in a single color or a mixture of colors. The lamp system 108 generates the simulated lighting environment 110 of the desired intensity, color, color temperature, direction, and/or beam width.

In one embodiment, the lamp system 108 is connected to or included in a display mirror. The display mirror can also include the light simulator 106. One example of a display mirror is described in WIPO Patent Publication No. WO03079318 to Horsten, et al., entitled Mirror With Built-In Display, incorporated by reference herein. The display mirror typically includes a display, such as a liquid crystal display (LCD), an organic light emitting diode (OLED) display, a plasma display, or the like, behind a mirror. The display is only visible through the mirror when the display is illuminated. In one embodiment, the display mirror includes a touch sensitive user interface so that the user can adjust the lamp system 108, such as selecting between light settings. In one example, the user can select a stored light setting for the user's office or favorite disco. In another example, the user can select light settings and create adjusted light settings as discussed for FIGS. 2A-2D above. In one embodiment, the lamps 160 can be part of the display mirror lighting the display. In an alternative embodiment, the lamps 160 can be mounted around the display mirror or in the area of the display mirror, lighting the area and the user.

Figure 3:
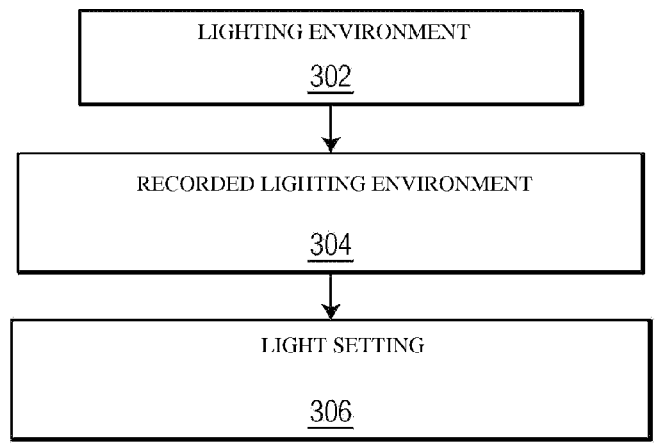
FIG. 3 is a flow chart of a method of light control employing a light condition recorder made in accordance with the present invention.

FIG. 3 is a flow chart of a method of light control employing a light condition recorder made in accordance with the present invention. The user records a lighting environment 302, acquires a light setting corresponding to the recorded lighting environment 304, and generates a simulated lighting environment in response to the light setting 306. The user can optionally adjust the light setting for user preferences.

In one embodiment, recording a lighting environment 302 includes taking a photograph. The photograph can then be analyzed to acquire a light setting corresponding to the recorded lighting environment. In one embodiment, the photograph can be associated with the light setting in response to taking the photograph. In an alternative embodiment, recording a lighting environment 302 includes recording a light parameter selected from the group consisting of light intensity and light color information.

In one embodiment, acquiring a light setting corresponding to the recorded lighting environment 304 includes uploading the light setting from a light system producing the lighting environment. In an alternative embodiment, acquiring a light setting corresponding to the recorded lighting environment 304 includes uploading the light setting from a light setting storage device. A symbol associated with the light setting can also be uploaded to record the lighting environment.

In one embodiment, the user can store the light setting and associate a symbol with the stored light setting. The symbol can be a photograph, graphical image, drawing, icon, title, combinations thereof, or the like. One light setting can be represented by more than one symbol, such as a photograph, a graphical image, and an icon.

Figure 4:
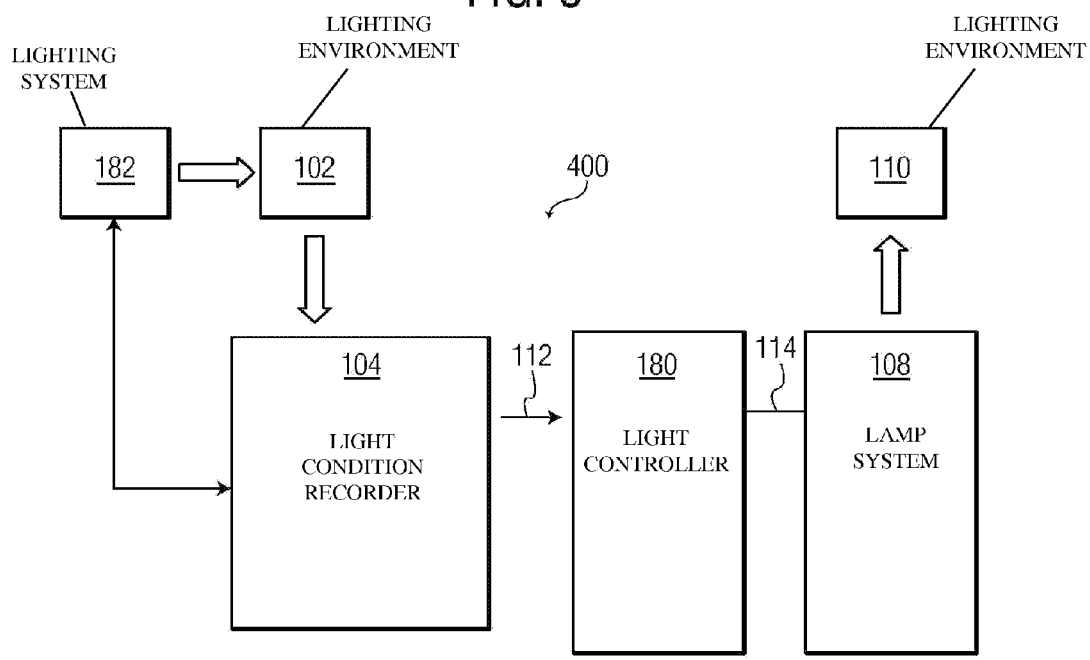
FIG. 4 is a block diagram of another light condition recorder system made in accordance with the present invention.

FIG. 4, in which like elements share like reference numbers with FIG. 1, is a block diagram of another light condition recorder system made in accordance with the present invention. In this embodiment, a light condition recorder system 400 allows a user to record a lighting environment 102 produced by a lighting system 182 and to generate a lighting environment 110. The lighting system 182 can incorporate light controllers and lamps, as desired. The light condition recorder system 400 includes the light condition recorder 104 responsive to the lighting environment 102 and generating an environment signal 112, a light controller 180 responsive to the environment signal 112 and generating a lamp control signal 114, and lamp system 108 responsive to the lamp control signal 114 and generating the lighting environment 110. One or a number of light settings can be stored in the light condition recorder 104, which is typically a mobile device such as a mobile telephone or a personal digital assistant (PDA) with suitable optics and circuitry for taking a photograph. The lighting environment 110 is substantially equivalent to the lighting environment 102, i.e., having approximately the same color, brightness, and saturation values when viewed by a typical observer.

The light settings associated with the lighting environment 102 can be acquired by the light condition recorder 104 in various ways, depending on the interaction of the light condition recorder 104 with the lighting system 182 generating the lighting environment 102. The light settings can then be used with the light controller 180 and lamp system 108 to generate the lighting environment 110.

In one embodiment, the light condition recorder 104 controls the lighting system 182 generating the lighting environment 102, thus controlling the lighting environment 102. Because the light condition recorder 104 is in control, the light condition recorder 104 can save the light settings in use by the light condition recorder 104 in generating the lighting environment 102 when taking a photograph of the lighting environment 102.

In another embodiment, the light condition recorder 104 is in communication with the lighting system 182 generating the lighting environment 102, but may or may not be in control of the lighting environment 102. When taking a photograph of the lighting environment 102, the light condition recorder 104 can save the light settings in use by the lighting system 182 in generating the lighting environment 102 by uploading the light settings from the lighting system 182 to the light condition recorder 104.

In another embodiment, the light condition recorder 104 may or may not be in communication with the lighting system 182 generating the lighting environment 102. The light condition recorder 104 can save the light settings in use in generating the lighting environment 102 by taking a photograph of the lighting environment 102 and analyzing the photograph to generate the light settings. The photograph can be analyzed for color, brightness, and saturation values. The color space of the photograph, such as sRGB, can be converted to lighting color space, such as x, y, Y, and even into the color space of the specific lamps of the lighting system 108, as desired for a particular application. The analysis can also apply optimization algorithms, such as gamma correction, brightness correction, or the like, as desired. One example of analysis is described in WIPO Patent Publication No. WO2004006570 to Diederiks, et al., entitled Method Of And System For Controlling An Ambient Light And Lighting Unit, incorporated by reference herein.

Once the light settings are stored in the light condition recorder 104, such as a mobile telephone, PDA, or the like, the light condition recorder 104 can be used with any lighting system to generate a lighting environment that is substantially equivalent to the lighting environment 102, i.e., having approximately the same color, brightness, and saturation values when viewed by a typical observer. The lighting ambience of the lighting environment 102 can therefore be easily transported to another location.

Figure 5:
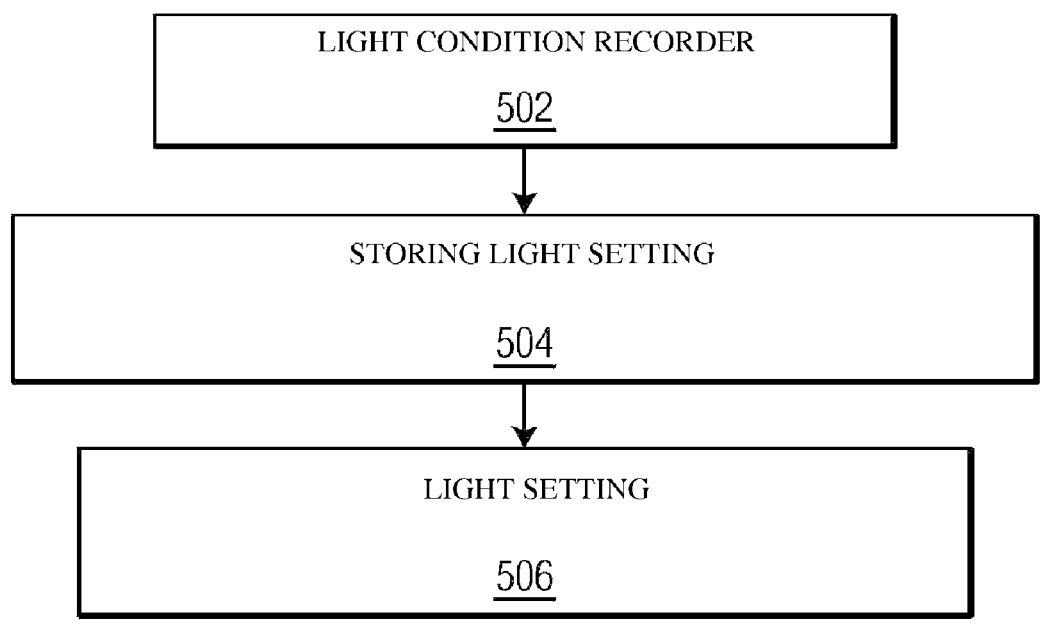
FIG. 5 is a flow chart of another method of light control employing a light condition recorder made in accordance with the present invention.

FIG. 5 is a flow chart of another method of light control employing a light condition recorder made in accordance with the present invention. A light condition recorder is provided 502 and a light setting corresponding to a lighting environment is stored in the light condition recorder 504. A second lighting environment is generated in response to the light setting 506. In one embodiment, the second lighting environment is substantially equivalent to the lighting environment, i.e., the typical observer would perceive the same color, brightness, and saturation values for both lighting environments.

In one embodiment, light condition recorder controls the lighting environment, and the storing light setting 504 includes storing the light setting used by the light condition recorder in controlling the lighting environment. In another embodiment, the storing light setting 504 includes storing the light setting from a light system generating the lighting environment. In another embodiment, the method further includes taking a photograph of the lighting environment with the light condition recorder, and analyzing the photograph with the light condition recorder to generate the light setting.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced within.

The invention claimed is:

1. A light control system comprising:
  a light condition recorder, the light condition recorder being responsive to a lighting environment through an optical environmental interface, said light condition recorder including a recorder storage electronically storing a plurality of optical variables received through said optical environmental interface, said light condition recorder further including a processor for analyzing said plurality of optical variables and generating an environment signal;
  a light simulator comprising a light simulator processor and light simulator storage; said storage storing said plurality of optical variables represented in said environment signal, said simulator including a user-adjustable light mixing user interface, said light simulator being responsive to the environment signal, and said user adjustable light mixing interface for analysis by said light simulator processor and generating a lamp control signal; and
  a lamp system including a plurality of illumination devices, the lamp system being responsive to the lamp control signal and generating a simulated lighting environment;
  wherein the simulated lighting environment is substantially equivalent to said environment signal as modified by said user adjustable light mixing.

2. The light condition recorder system of claim 1 wherein the light condition recorder is selected from the group consisting of a mobile telephone, a personal digital assistant (PDA), a digital camera, a light meter, and a notebook computer.

3. The light condition recorder system of claim 1 wherein the light condition recorder has an environmental interface selected from the group consisting of an optical sensor, a signal interface, an optical power detector, and a color sensor.

4. The light condition recorder system of claim 1 wherein the light condition recorder has a recorder interface dockable with the light simulator.

5. The light condition recorder system of claim 1 wherein the light condition recorder has a wireless recorder interface.

6. The light condition recorder system of claim 1 wherein the user interface is selected from the group consisting of a linear slider, a radius circular slider, an extended circular slider, and a bounded circular slider.

7. The light condition recorder system of claim 1 wherein the light condition recorder has a light mixing user interface selected from the group consisting of a linear slider, a radius circular slider, an extended circular slider, and a bounded circular slider.

8. The light condition recorder system of claim 1 wherein the lamp system is a display mirror.

9. The light condition recorder system of claim 8 wherein the display mirror has a touch sensitive user interface.

10. A light condition and recorder system for controlling a lamp system for recordation of a light environment and reproducing the light environment, comprising:
- a light condition recorder having a plurality of optical sensors including light intensity and color, said optical sensors creating electronic optical variables received through said sensors and stored in a light condition recorder storage,
- said light condition recorder further having a processor for analyzing said plurality of optical variables, calculating an environment signal based upon said electronic optical variables and transmitting said environmental signal;
- a light controller having a light controller processor and light controller storage,
- wherein said light controller storage stores said plurality of electronic optical variables represented in said environment signal as stored environmental light conditions,
- said light controller storing a plurality of said stored environmental light conditions;
- wherein said light controller further includes a user-adjustable light mixing interface for modifying a lamp control signal generated by said light controller, said modified lamp control signal based upon said user-adjustable light mixing input and said stored environmental light conditions;
- said light controller being responsive to said environmental signal and said user adjustable light mixing interface for analysis and modification by said light controller processor and generating said lamp control signal;
- a lamp system including a plurality of illumination devices, said lamp system being responsive to said lamp control signal thereby incorporating said environmental signal of said light condition recorder and said user adjustable light mixing input in optical output from said lamp system.

\* \* \* \* \*